United States Patent [19]

Jernigan et al.

[11] Patent Number: 5,233,423
[45] Date of Patent: Aug. 3, 1993

[54] EMBEDDED COMMERICALS WITHIN A TELEVISION RECEIVER USING AN INTEGRATED ELECTRONIC BILLBOARD

[75] Inventors: Forest E. Jernigan, Morristown; Joseph P. Bingham, Knoxville, both of Tenn.

[73] Assignee: North American Philips Corporation, New York, N.Y.

[21] Appl. No.: 618,349

[22] Filed: Nov. 26, 1990

[51] Int. Cl.$^5$ .................... H04N 5/268; H04N 5/272
[52] U.S. Cl. ..................................... 358/181; 358/183
[58] Field of Search .................. 358/181, 188, 22 PIP, 358/22, 183, 85, 84, 908, 86

[56] References Cited

U.S. PATENT DOCUMENTS

| | | | |
|---|---|---|---|
| 4,344,090 | 8/1982 | Belisomi et al. | 358/183 |
| 4,459,585 | 7/1984 | Pasternak | 358/183 |
| 4,814,883 | 3/1989 | Perine et al. | 358/181 |
| 4,855,833 | 8/1989 | Kageyama et al. | 358/181 |
| 4,918,531 | 4/1990 | Johnson | 358/181 |
| 4,974,085 | 11/1990 | Campbell et al. | 358/85 |
| 4,984,082 | 1/1991 | Okamura | 358/22 |
| 5,027,211 | 6/1991 | Robertson | 358/183 |
| 5,060,068 | 10/1991 | Lindstrom | 358/86 |

*Primary Examiner*—James J. Groody
*Assistant Examiner*—Jeffrey S. Murrell
*Attorney, Agent, or Firm*—Edward W. Goodman

[57] ABSTRACT

A television receiver is equipped with a graphics generator which is capable of generating a single or multiple graphic images from data representing commercial advertisements stored in a memory device. The elements of this arrangement include a micro-controller, a memory device, a graphics and memory controller, a pallet controller and a video switch. The images corresponding to the commercial advertisements are displayed to the consumer when a control function of the television receiver is activated. Alternatively, the images may be displayed in response to an internal clock. The images presented may be static or animated and may occupy a small portion of the screen or the full screen.

10 Claims, 3 Drawing Sheets

2

EMBEDDED COMMERICALS WITHIN A TELEVISION RECEIVER USING AN INTEGRATED ELECTRONIC BILLBOARD

BACKGROUND OF THE INVENTION

1. Field of the Invention

The invention relates to a method and apparatus for providing commercial advertising in a television receiver.

2. Description of the Related Art

Various television networks broadcast televised entertainment to the consumer free of charge. This is made economically possible by the inclusion of paid advertisements with the televised entertainment. Depending on the popularity of the particular televised program, advertisers are charged varying fees for their advertisements. These fees are also dependent on the length of each advertisement, the frequency of occurrence and the number of days (weeks, months) over which the advertiser desires the advertisement to be broadcast.

Quite understandably, this form of advertising is very costly; for example, a single minute of advertising during the Super Bowl may cost upwards of one million dollars.

SUMMARY OF THE INVENTION

It is an object of the present invention to provide a method and apparatus by which commercial advertisements may be delivered to the consumer at a significantly lower cost to the advertiser.

This object is achieved by locally generating the advertisements in the television receivers. In particular, the method comprises locally storing in said television receiver data representing commercial advertisements, selectively converting said data into video signals, and selectively switching said video signals to the display of said television receiver for a predetermined period of time.

Apparatus for carrying out this method may then comprise means for storing data representing said commercial advertising, means for converting said stored data into video signals for display. control means coupled to said storing means for selectively applying said data to said converting means, and switching means for switching said video signal to the display of said television receiver for a predetermined period of time, said switching means being controlled by said control means.

With this arrangement, upon the payment of an advertising fee, an advertiser may have his/her advertisements encoded and stored in a read-only memory by a television receiver manufacturer. This ROM is then installed into television receivers containing the arrangement of the invention. Thereafter, at various times during operation of the television receiver by the consumer, the advertiser's advertisement is displayed on the screen of the television receiver. The displaying of the advertisement may be time dependent, that is, the advertisement may appear at regular time intervals, or may be triggered by the operation of a control function of the television receiver, for example, power-on, channel change, etc. The advertisement may take the form of a static image which appears on the screen in the same manner as the known "on-screen" channel number displays, as a banner across the bottom of the screen, etc., or as an animated image in the above manner. In the event that multiple advertisements are stored in the ROM, the arrangement of the invention may then cycle through to the next one of these advertisements each time it is to display one.

The invention also contemplates the ability to update the contents of the advertisement memory such that new advertisements may be stored at a later date. The data representing these new advertisements may be sent to the television receiver over telephone lines, cable television services, broadcast data services, etc.

As an added benefit to the consumer, the arrangement may also include the ability of storing certain user-programmable information for displaying personal information such as birthday announcements.

In order to ensure that the paid-for advertisements are indeed periodically shown on the television receiver, the arrangement may include circuitry which defeats the operation of the television receiver if the arrangement has been tampered with by the consumer or any other unauthorized service person.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENT

Figure 1:
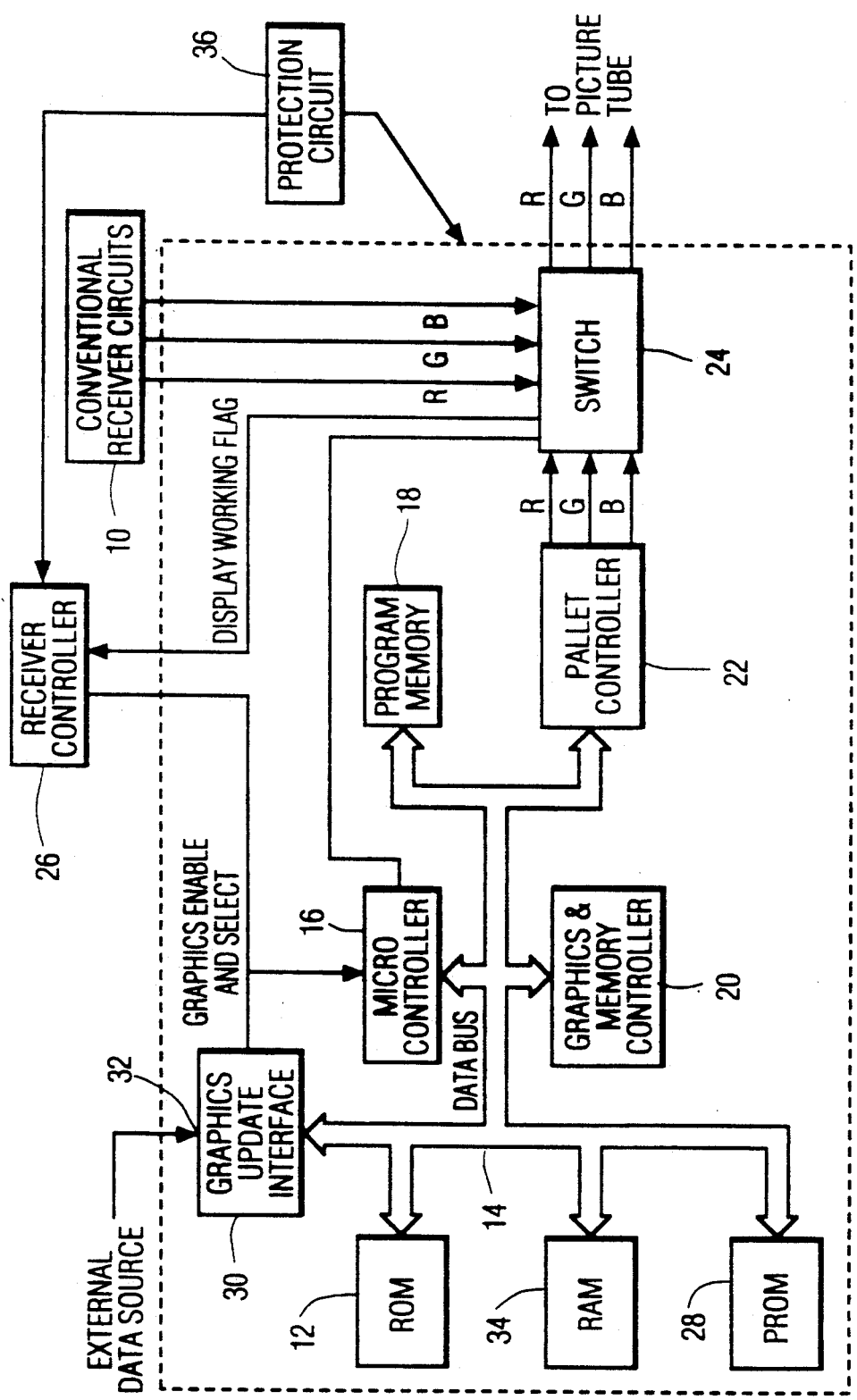
FIG. 1 is a block diagram of an arrangement according to the invention.

FIG. 1 shows a block diagram of an embodiment of the invention in which the arrangement is incorporated within a standard television receiver. In particular, the television receiver includes conventional receiver circuits 10, including a tuner, an audio processing circuit and a video processing circuit. The convention receiver circuits 10 provide video signals RGB in the case of color) which are applied to a picture tube (not shown) for display.

In a first embodiment of the invention, the arrangement includes a read-only memory (ROM) 12 in which data representing the various advertisements are stored. This ROM 12 is connected by a data bus 14 to a micro-controller 16 which, in conjunction with a program stored in program memory 18 coupled thereto by the data bus 14, determines when and which one of the various advertisements are to be displayed. To this end, a graphics and memory controller 20 is coupled to the micro-controller 16 and the ROM 12 for addressing the ROM 12 under control of the micro-controller 16 and for generating the appropriate graphic images representative of the data being addressed in the ROM 12. The output from the graphics and memory controller 20 is applied to a pallet controller 22 (in the event of color) via the data bus 14 which generates the RGB video signals for the particular advertisement. The RGB outputs of the pallet controller 22 are applied to a first input set of a switch 24 which receives at a second input set the RGB video signals from the conventional receiver circuits 10. Under control of the micro-controller 16, this switch 24 then selectively applies the advertisement video signals to the picture tube for a predetermined period of time.

In the above configuration, the micro-controller 16 causes the advertisements to be displayed at regular time intervals in sequence. To this end, the micro-controller 16 includes an internal clock/calendar. However, it may be alternatively desired that the advertisements be displayed whenever a control function of the television receiver is addressed.

In a second embodiment of the invention, the television receiver includes a receiver controller 26 which incorporates at least the power-on switch, the channel-up and -down control and the volume control. When any of these control functions are utilized, the receiver controller 26, in addition to performing the desired function, sends a control signal to the micro-controller 16 indicating which of the control functions was operated. The micro-controller 16 then causes one of the advertisements to be displayed for a predetermined period of time.

In a third embodiment of the invention, the ability to update the advertisements is provided. The arrangement includes a programmable read-only memory (PROM) 28 which is also coupled to the data bus 14. A graphics update interface 30 is also coupled to the data bus 14 for providing update data to be written into the PROM 28 under the control of micro-controller 16 and the receiver controller 26. The graphics update interface includes a data input 32 for receiving the data updates which may be provided through data port in the television receiver connected to telephone lines, cable television services or broadcast data services.

In a fourth embodiment of the invention, the consumer may be given the added benefit of including with the advertisements, various consumer programmable information including birthday or anniversary announcements, holiday greetings, seasonal notices, etc. Random-access memory (RAM) 34 is shown connected to data bus 14 for storing this consumer programmable information. In response to on-screen instructions effected by the receiver controller 26 and the micro-controller 16, the consumer is instructed to enter the appropriate information through the receiver controller 26 for storage in the RAM 34. Thereafter, the micro-controller 16 causes this information to be displayed sequentially with the advertisements in the ROM 12 and/or the PROM 28.

In order to ensure that the paid-for advertising is indeed displayed, the arrangement includes a protection circuit 36 for detecting whether the arrangement has been tampered with by the consumer or any unauthorized service person. In the event that the protection circuit 36 detects tampering, a signal is sent to the receiver controller 26 disabling the television receiver until an authorized service person resets the system.

Finally the arrangement may include an auditing function to enable the logging into memory of the actual displaying of the advertisements. To this end, the micro-controller 16 applies this data to the RAM 34 which may at some later time be interrogated for its contents.

Figure 2A:
FIGS. 2A–2E are representative displays on the television receiver showing various ways in which the advertisements may be presented.
Figure 2B:
Figure 2C:
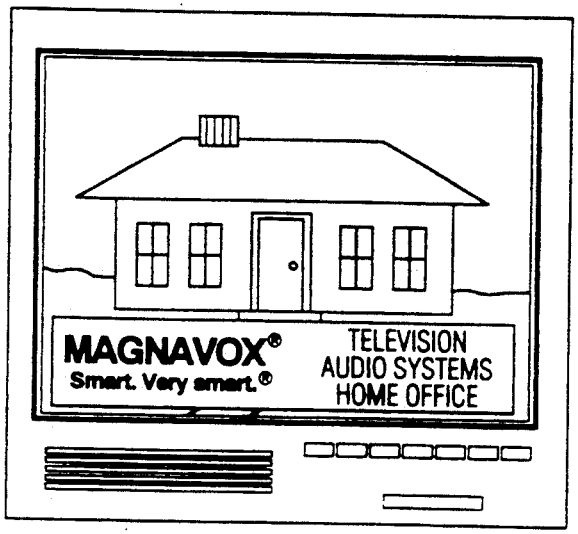
Figure 2D:
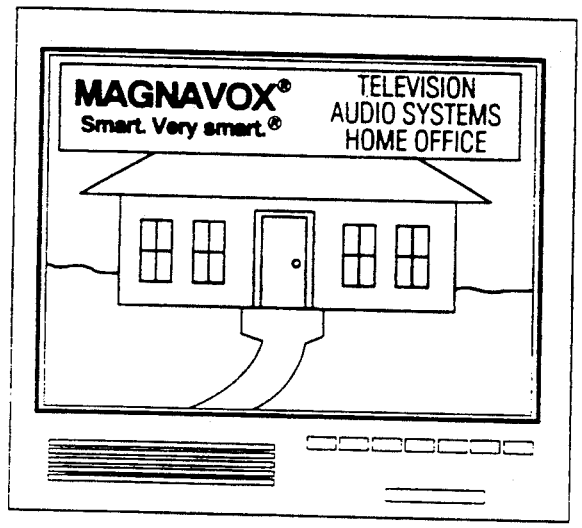
Figure 2E:

It should be understood that the display of the advertisements may take any convenient form. In particular, for example, upon power-on, an advertisement may be displayed full screen for a predetermined period of time as shown in FIG. 2A. When a channel change function has been selected, the advertisement may appear as a small insert along with, if available, the on-screen channel display as shown in FIG. 2B. Alternatively, the advertisement may appear as a banner across the bottom or top of the display screen see FIGS. 2C and 2D). If the television has a PIP function, the advertisement may be displayed full screen while the picture being watched is displayed as the PIP (FIG. 2E).

Numerous alterations of the structure herein disclosed will present themselves to those skilled in the art. However, it is to be understood that the present description is meant to be for illustration purposes only. All such modifications which do not depart from the spirit of the invention are intended to be included within the scope of the appended claims.

What is claimed is:

1. An arrangement in a television receiver for locally generating commercial advertising for display, said television receiver having a display, conventional receiver circuits for receiving and processing television signals and for applying video signals corresponding to said television signals to said display, and a receiver controller having a plurality of user operable control switches for controlling various standard operating functions of said television receiver, said arrangement comprising:

means for storing data representing a plurality of separate commercial advertisements;

means for converting said stored data into commercial video signals for display;

control means coupled to said storing means for selectively applying data representing a selected one of said plurality of separate commercial advertisements to said converting means;

switching means for switching said commercial video signals to the display of said television receiver for a predetermined period of time, said switching means being controlled by said control means, wherein said switching means effectively superposes said commercial advertisements over a portion of a displayed picture; and means for sensing the operation of each and every one of said plurality of control switches, said sensing means being coupled to said control means whereby said control means effects the display of said commercial video signals corresponding to said selected one of said commercial advertisements in response to said sensing means sensing operation of each and every one of said plurality of control switches.

2. An arrangement as claimed in claim 1, characterized in that said arrangement further comprises means for updating said data stored in said storing means.

3. An arrangement as claimed in claim 1, characterized in that said storing means comprises a read-only memory.

4. An arrangement in a television receiver for locally generating commercial advertising for display, said arrangement comprising:

means for storing data representing said commercial advertising;

means for converting said stored data into video signals for display;

control means coupled to said storing means for selectively applying said data to said converting means;

switching means for switching said video signal to the display of said television receiver for a predetermined period of time, said switching means being controlled by said control means;

means for sensing whether said arrangement has been disconnected from said television receiver; and disabling means connected to said television receiver for disabling the operation of said television receiver in response to said sensing means.

5. A method of advertising on a television receiver, said television receiver having a display, conventional receiver circuits for receiving and processing television signals and for applying video signals corresponding to said television signals to said display, and a receiver controller having a plurality of user operable control switches for controlling various standard operating functions of said television receiver, said method comprising the steps:
- locally storing in said television receiver data representing a plurality of separate commercial advertisements;
- converting data representing a selected one of said plurality of separate commercial advertisements into commercial video signals;
- sensing the operation of each and every one of said plurality of control switches; and
- selectively switching said commercial video signals to the display of said television receiver for a predetermined period of time in response to sensing the operation of each and every one of said plurality of control switches, wherein said step of selectively switching said commercial video signals effectively superposes said commercial advertisements over a portion of a displayed picture.

6. A method of advertising as claimed in claim 5, wherein said method further comprises periodically updating said data to represent different commercial advertisements.

7. A method of advertising as claimed in claim 5, wherein said commercial advertisements consist of static images.

8. A method of advertising as claimed in claim 5, wherein said commercial advertisements consist of animated images.

9. A method of advertising as claimed in claim 5, wherein said commercial advertisements consist of a combination of static and animated images.

10. A method of advertising on a television receiver, said television receiver having a display, conventional receiver circuits for receiving and processing television signals and for applying video signals corresponding to said television signals to said display, and a receiver controller having a plurality of user operable control switches for controlling various standard operating functions of said television receiver, said method comprising the steps:
- locally storing in said television receiver data representing a plurality of separate commercial advertisements;
- converting data representing a selected one of said plurality of separate commercial advertisements into commercial video signals;
- sensing the operation of each and every one of said plurality of control switches;
- selectively switching said commercial video signals to the display of said television receiver for a predetermined period of time in response to sensing the operation of each and every one of said plurality of control switches; and
- selectively switching said commercial video signals to the display of said television receiver for a predetermined period of time, wherein said commercial video signal are selectively switched to said display at regular time intervals, wherein said steps of selectively switching said commercial video signals effectively superposes said commercial advertisements over a portion of a displayed picture.

* * * * *